US007007247B1

(12) United States Patent
Wang et al.

(10) Patent No.: US 7,007,247 B1
(45) Date of Patent: Feb. 28, 2006

(54) METHOD AND MECHANISM FOR RTL POWER OPTIMIZATION

(75) Inventors: Qi Wang, San Jose, CA (US); Sumit Roy, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 659 days.

(21) Appl. No.: 10/155,323

(22) Filed: May 24, 2002

(51) Int. Cl.
G06F 17/50 (2006.01)
(52) U.S. Cl. .................. 716/2; 716/3; 716/7; 716/6; 716/18
(58) Field of Classification Search ............... 716/2, 716/3, 7, 6, 18
See application file for complete search history.

(56) References Cited

U.S. PATENT DOCUMENTS

| | | | | |
|---|---|---|---|---|
| 4,698,760 | A * | 10/1987 | Lembach et al. ............ | 716/6 |
| 5,426,591 | A * | 6/1995 | Ginetti et al. ............... | 716/6 |
| 5,619,420 | A * | 4/1997 | Breid .......................... | 716/8 |
| 5,764,525 | A * | 6/1998 | Mahmood et al. .......... | 716/18 |
| 5,774,367 | A * | 6/1998 | Reyes et al. ................. | 716/2 |
| 5,799,170 | A * | 8/1998 | Drumm et al. .............. | 716/2 |
| 5,831,864 | A * | 11/1998 | Raghunathan et al. ...... | 716/2 |
| 6,009,248 | A * | 12/1999 | Sato et al. ................... | 716/2 |
| 6,038,386 | A * | 3/2000 | Jain ............................ | 716/16 |
| 6,205,571 | B1 * | 3/2001 | Camporese et al. ......... | 716/2 |
| 6,260,184 | B1 * | 7/2001 | Brennan et al. ............. | 716/14 |
| 6,269,468 | B1 * | 7/2001 | Dean et al. .................. | 716/2 |
| 6,311,310 | B1 * | 10/2001 | Bernstein et al. ........... | 716/2 |
| 6,311,313 | B1 * | 10/2001 | Camporese et al. ......... | 716/6 |
| 6,324,679 | B1 * | 11/2001 | Raghunathan et al. ...... | 716/18 |
| 6,397,170 | B1 * | 5/2002 | Dean et al. .................. | 703/14 |
| 6,453,444 | B1 * | 9/2002 | Shepard ....................... | 716/2 |
| 6,463,574 | B1 * | 10/2002 | Culetu et al. ................ | 716/8 |
| 6,477,695 | B1 * | 11/2002 | Gandhi ........................ | 716/17 |
| 6,536,024 | B1 * | 3/2003 | Hathaway .................... | 716/6 |
| 6,557,159 | B1 * | 4/2003 | Kutzschebauch et al. ... | 716/18 |
| 6,578,176 | B1 * | 6/2003 | Wang et al. ................. | 716/2 |
| 6,658,634 | B1 * | 12/2003 | Goodnow et al. ........... | 716/6 |
| 6,785,870 | B1 * | 8/2004 | Chen ........................... | 716/2 |
| 6,792,582 | B1 * | 9/2004 | Cohn et al. .................. | 716/7 |
| 6,794,674 | B1 * | 9/2004 | Kusumoto ............. | 257/E23.151 |
| 6,912,697 | B1 * | 6/2005 | Shibata et al. .............. | 716/1 |

(Continued)

OTHER PUBLICATIONS

Kapadia et al., "Reducing Switching Activity on Datapath Buses with Control-Signal Gating", Proceedings of the IEEE 1998 Custom Integrated Circuit Conference, May 11, 1998, pp. 589-592.*

(Continued)

Primary Examiner—Matthew Smith
Assistant Examiner—Phallaka Kik
(74) Attorney, Agent, or Firm—Bingham McCutchen LLP

(57) ABSTRACT

The present invention provides a method and mechanism for optimizing the power consumption of a micro-electronic circuit. According to an embodiment, when optimizing the power consumption of a micro-electronic circuit, one or more candidates for applying one or more optimization techniques may be identified. Then, the one or more candidates may be marked with the one or more optimization techniques within the micro-electronic circuit without altering the data and/or control paths of the circuit. Then, after timing and logic optimization, each power saving technique applied to the one or more candidates may be evaluated to determine whether the technique saves power and/or satisfies the timing requirement of the circuit. Further, each power saving technique applied to the one or more candidates may be evaluated to determine whether the technique is reducible, and if so, then the technique may be reduced to determine whether such reduction improves the circuit's timing.

42 Claims, 6 Drawing Sheets

U.S. PATENT DOCUMENTS

| | | | |
|---|---|---|---|
| 6,922,818 B1 * | 7/2005 | Chu et al. ........................ | 716/2 |
| 2002/0053063 A1 * | 5/2002 | Bhattacharya et al. .......... | 716/1 |
| 2002/0112212 A1 * | 8/2002 | Cohn et al. ...................... | 716/1 |
| 2003/0145289 A1 * | 7/2003 | Anderson ........................ | 716/2 |
| 2003/0177452 A1 * | 9/2003 | Chen ............................... | 716/2 |
| 2003/0177460 A1 * | 9/2003 | Chen ............................... | 716/5 |
| 2003/0204822 A1 * | 10/2003 | Whitaker et al. ............... | 716/2 |
| 2004/0019857 A1 * | 1/2004 | Teig et al. ....................... | 716/1 |

OTHER PUBLICATIONS

Benini et al., "Saving Power by Synthesizing Gate Clocks for Sequential Circuits", IEEE Design & Test of Computers, vol. 11, No. 4, Winter 1994, pp. 32-41.*

Togawa et al., "A Simultaneous Placement and Global Routing Algorithm for FPGAs with Power Optimization", The 1998 IEEE Asia-Pacific Conference on Circuits and Systems, Nov. 24, 1998, pp. 125-128.*

Wu et al., "Design and Optimization of Power/Ground Network for Cell-Based VLSI with Macro Cells", Proceedings of the ASP-DAC '99, Asia South Pacific Design Automation Conference, vol. 1, Jun. 18, 1999, pp. 21-24.*

Sundararajan et al., "Low Power Gate Resizing of Combinational Circuits by Buffer-Redistribution", Proceedings of 20th Anniversary Conference on Advanced Research in VLSI, Mar. 21, 1999, pp. 170-184.*

Kapadia et al., "Reducing Switching Activity on Datapath Buses with Control-Signal Gating", IEEE Journal of Solid-State Circuits, vol. 34, No. 3, pp. 405-414.*

Pedram, Massoud, "Power Minimization in IC Design: Principles and Applications", *ACM Transactions on Design Automation of Electronic Systems,* vol. 1, No. 1, Jan. 1996, pp. 3-56.

Van Eijndhoven, J.T.J. et al., "The ASCIS Data Flow Graph Semantics and Textual Format", EUT Report 91-E-251, *Eindhoven University of Technology Research Reports,* Eindhoven University of Technology, Eindhoven, The Netherlands, Jun. 1991, pp. 1-47.

* cited by examiner

METHOD AND MECHANISM FOR RTL POWER OPTIMIZATION

BACKGROUND AND SUMMARY

Power consumption has become an important optimization metric in the design of micro-electronic circuits. Optimizing the power consumption may be achieved at various abstract levels of design, from algorithmic and system levels down to layout and circuit levels. Typically, power optimization techniques applied at the higher abstract levels have a higher potential for saving power. Particularly, power optimization techniques and/or modifications applied at the register-transfer level (RTL)—where the system is conceptualized in terms of registers and data transfers—may save a substantial amount of power.

For example, turning to FIG. 1, a circuit 1 having a register bank 50, coupled to a clock signal, that takes the result 45 of a multiplier 40 as its only input is shown at the RTL. The multiplier 40 has two inputs, x and y. The inputs and signals are digital and thus, will have either ON or OFF (1 or 0) values, or a combination thereof. In this circuit, there are two enable signals, en1 and en2, coupled together by an AND gate 10 to produce a resulting signal 15, and the register bank 50 will only load the result 45 of the multiplier 40 when the resulting signal is ON, i.e., when both enable signals, en1 and en2, are ON.

During the clock cycle, when the register bank 50 is not loading the result 45, i.e., when either en1 or en2 are OFF, the power dissipated by the multiplier 40 is wasted. This waste may be significant because the multiplier 40 typically consumes a substantial amount of power. One possible solution is to apply a power saving technique and/or modification known in the art called "sleep-mode transformation," wherein the multiplier 40 and its input data paths, x and y, are shutdown when its outputs 45 are not used. This may be achieved by coupling the resulting signal 15 with the inputs, x and y, via two banks of AND gates, 20 and 30. Thus, the inputs, x and y, will be loaded into the multiplier 40 only when the resulting signal 15 is ON and the register 50 is enabled to load the results 45 of the multiplier 40.

Micro-electronic circuits, such as the circuit above, may be developed using a high-level language, such as the Very High Speed Integrated Circuit Hardware Description Language (VHDL). Further, there are several commercially available tools such as Electronic Computer-Aided Design (ECAD) programs that enable developers to design, synthesize, optimize, and simulate the circuits at the RTL. Some of the tools allow developers to apply power saving techniques and/or modifications, such the sleep-mode transformation described above.

However, the tools generally require that the techniques and modifications be applied during the synthesis of the micro-electronic circuits, when the circuit has yet to be optimized and simulated. For example, when using the VHDL to apply the sleep-mode transformation technique to a circuit design, the tools require that the developer put pragmas—which are synthetic comments to direct the actions of the VHDL compiler—in the VHDL code to inform the compiler which functional blocks, such as the multiplier 40, to be put into sleep-mode.

This is done before any optimization or simulation is done. Thus, power consumption and timing—another important optimization metric—have to be estimated, which may cause some difficulty in the design process. Generally, faster performing circuits consume more power. Thus, in some instances, adding power saving techniques and/or modifications may cause the circuit to perform slower. If, after timing and logic optimization tools are applied, the timing requirement for design is violated, then either the tools have to undo the sleep-mode transformations to improve the timing, or in the worst case, the developer may have to manually fix the timing problems. But, if the timing and logic optimization tools are applied after the power saving techniques are applied, undoing the power saving techniques and/or modifications may not be a simple task.

One reason is because the timing of the circuit generally depends upon the timing of the critical paths within the circuit, which are the slowest paths that data must travel during circuit operation. The timing optimization tools primarily optimize the critical paths. Because the power saving techniques and/or modifications are applied to the circuit based on estimations instead of accurate information, the techniques and/or modifications may sometimes create critical paths that would not otherwise be critical paths but for the techniques and/or modifications. Thus, if the timing optimization tools operate after the power saving techniques and/or modifications are applied, then the optimization tools may optimize the wrong critical paths, i.e., critical paths created by the power saving techniques and/or modifications. When the timing optimization tools compensate for these wrong critical paths, the circuit may end up increasing the power consumption.

Further, undoing the technique and/or modification after optimization would be difficult in such a situation because the compensation done by the timing optimization tools would also have to be undone. A lot of time and effort would be wasted during the design and synthesis process.

The present invention provides a method and mechanism for applying power saving techniques and/or modifications to micro-electronic circuits. According to an embodiment, when optimizing the power consumption of a micro-electronic circuit, one or more candidates for applying one or more optimization techniques and/or modifications may be identified. Then, the one or more candidates may be marked within the micro-electronic circuit without materially modifying and/or committing the data and/or control paths of the circuit. Then, each power saving technique and/or modification applied to the one or more candidates may be evaluated to determine whether the technique and/or modification saves power and/or satisfies the timing requirement of the circuit. Further, each power saving technique and/or modification applied to the one or more candidates may be evaluated to determine whether the technique and/or modification is reducible, and if so, then the technique and/or modification may be reduced to determine whether such reduction improves the circuit's timing.

Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is disclosed in a number of embodiments as methods and mechanisms for optimizing the power consumption of a micro-electronic circuit. Some of the embodiments described use sleep-mode transformation as the power saving technique and/or modification. However, the principles presented here are applicable to any power saving technique and/or modification using any circuit design program, and thus the scope of the invention is not to be limited to the exact embodiments shown herein.

Figure 2:
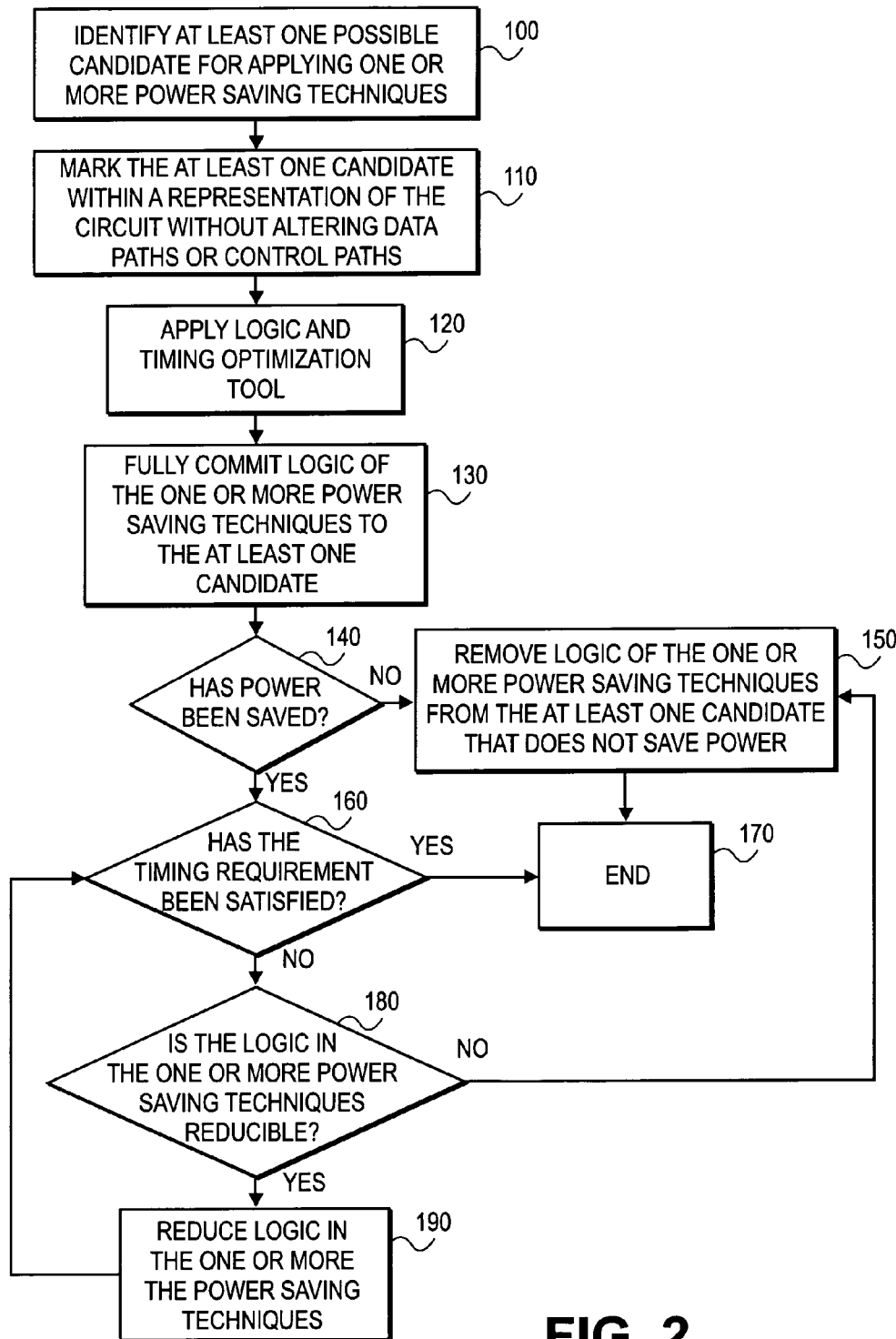
FIG. 2 is a flowchart of a power saving method in accordance with an embodiment of the present invention.

One approach to effectively apply power saving techniques and/or modifications to a micro-electronic circuit is illustrated in FIG. 2 as a method in accordance with an embodiment of the present invention. At the first step, one or more candidates are identified within the circuit to apply one or more power saving techniques and/or modifications (action block 100). This is preferably achieved during circuit synthesis at the RTL, which may be referred to as the RTL exploration phase. To facilitate in identifying the one or more candidates, a Control Data Flow Graph (CDFG) may be used. The CDFG is a standard for synthesizing and verifying integrated circuit designs from a behavioral level description. A CDFG may contain all the high level information, e.g., control and data flow, of the circuit, which facilitates in analyzing the function and structure of the circuit and identifying all possible candidates to apply the one or more power saving techniques and/or modifications.

Figure 1:
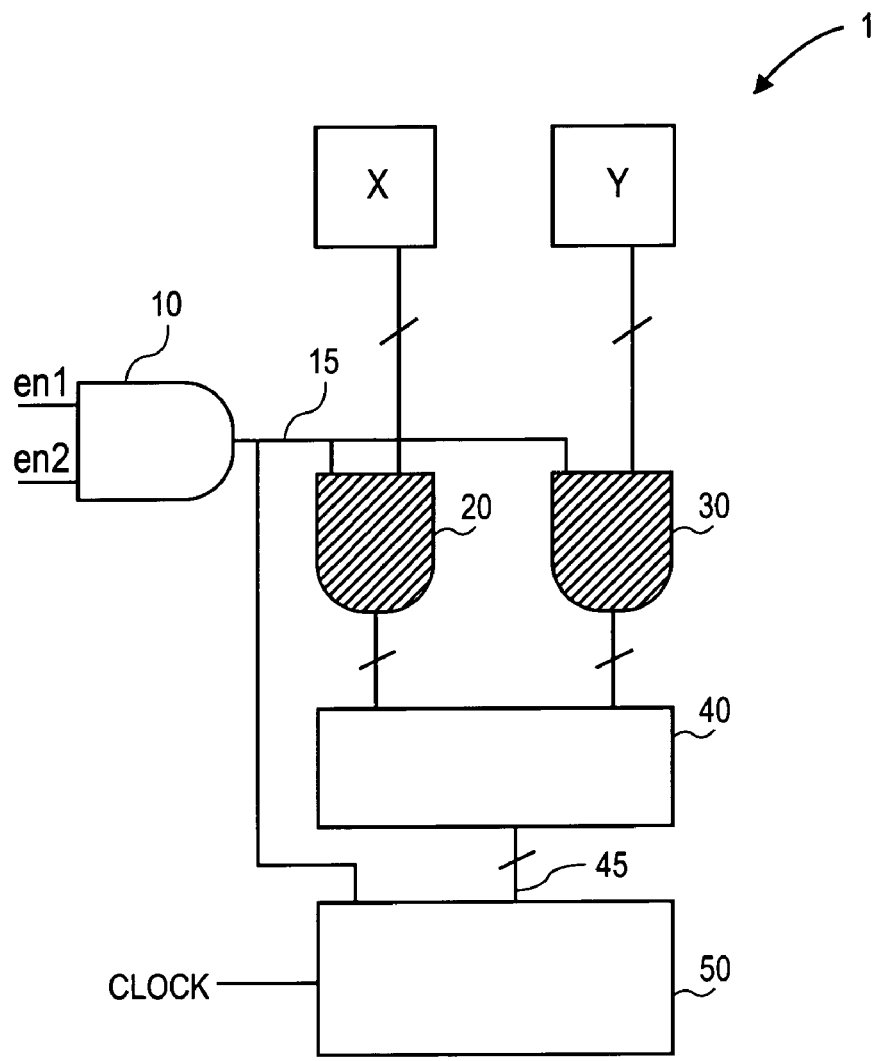
FIG. 1 is a circuit diagram with conventional sleep-mode transformations applied.

In the case of the sleep-mode transformation technique, a candidate may include enable functions and the corresponding combinational functional blocks controlled by the enable functions. For example, in FIG. 1, the enable functions are en1 and en2 coupled together with an AND gate (en1 AND en2), and the corresponding functional block is the multiplier 40. Generally, the enable functions are derived directly from the control flow of the circuit and will not be synthesized into some other logic during synthesis. Thus, the enable functions identified for the candidates will not be lost during synthesis. Candidates may also include other combinational functional blocks, such as arithmetic units and entire logical hierarchical blocks. A detailed description about how to use a CDFG to identify candidates by searching for blocks of idle periods for sleep-mode transformation is disclosed in U.S. patent application Ser. No. 09/793,309, entitled "Behavioral Level Observability Analysis and its Applications," filed on Feb. 26, 2001, which is hereby incorporated by reference in its entirety.

Figure 3:
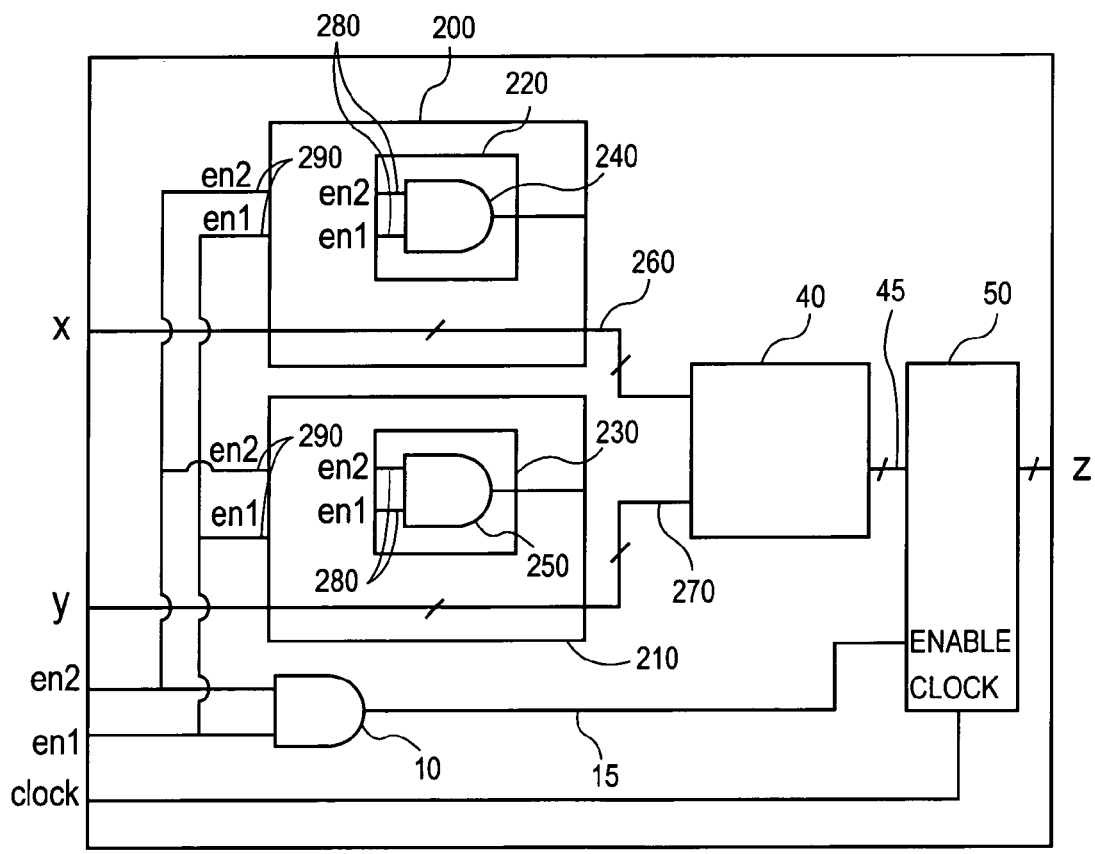
FIG. 3 is a circuit diagram with sleep-mode modules inserted in accordance with an embodiment of the present invention.

After identifying the one or more candidates, the candidates may be marked, preferably on a gate level netlist, as shown in FIG. 3, to remember where to apply potential power saving techniques without altering the data path or control path of the circuit design (action block 110). Turning to FIG. 3, an example netlist of a circuit, similar to the circuit shown in FIG. 1, having a register bank 50, coupled to a clock signal, that takes the result 45 of a multiplier 40 as its only input is shown. The multiplier 40 has two inputs, x and y. A CDFG analysis shows that the outputs 45 of the multiplier 40 are only used when both enable signals, en1 and en2, are ON. Thus, this may be an appropriate place to apply a power saving technique and/or modification, such as a sleep-mode transformation.

To mark the appropriate candidates—the enable signals en1/en2 and the multiplier 40—two "sleep-mode" modules, 200 and 210, are inserted into the circuit. The sleep-mode modules 200/210 each include "sleep-mode control" modules, 220/230, which include logic that implements the enable function for the candidate. In this example, the logic is an AND gate, 240/250, coupling en1 and en2 together within each sleep-mode control module, 220/230. There is a one-to-one correspondence between the input pins 280 of the sleep-mode control modules, 230/240, and the input ports 290 of the sleep-mode modules 200/210, but the pins 280 and the ports 290 are not connected, thus not materially modifying the control paths. The one-to-one correspondence may be desirable when the sleep-mode logic 240/250 are actually connected to the circuit. Further, the sleep-mode modules 200/210 pass the x and y input signals 270/260 through to the register 40, thus not materially modifying the data paths.

Because the original data and control paths of the circuit design are maintained and not materially modified, the logic and timing optimization tools applied later (action block 120 of FIG. 2) will work on the true critical paths instead of the wrong ones, and less effort is wasted. Further, by marking the candidates with the sleep-mode modules 200/210, even if the multiplier 40 hierarchy in the circuit is dissolved after optimization (action block 120), the candidates are still preserved.

After optimization (action block 120), the one or more power saving techniques and/or modifications may be applied or fully committed to the circuit (action block 130). For example, turning to FIG. 4, the logic within the sleep-mode modules 200/210 are fully committed. The input ports 290 of the sleep-mode modules 200/210 are connected to the input pins 280 of the sleep-mode control modules. Further, each pin 260/270 of the multiplier 40 inputs, x/y, are coupled, via an AND gate 300/310, to a resulting signal of en1 and en2 coupled together with an AND gate 240.

After the sleep-mode modules 200/210 have been committed, the modules 200/210 may be evaluated to determine whether the modules 200/210 save power to the circuit (decision block 140). This may be done by a conventional circuit simulator. If one or more of the modules 200/210 do not save any power, then the one or more modules 200/210 may be removed from the circuit (action block 150). However, if the one or more modules 200/210 do save power, then the one or more modules 200/210 may further be evaluated to determine whether the one or more modules 200/210 satisfy the timing requirement of the circuit (decision block 160), i.e., whether the one or more modules 200/210 create a critical path that causes the circuit to have delays beyond the timing requirement. If the timing requirement is still met, then the one or more modules 200/210 may remain fully committed (action block 170).

If the timing requirement has not been met, the one or more modules 200/210 may be completely removed. However, this may significantly limit the power savings that can be achieved. Another approach is to determine whether the logic within the one or more modules is reducible (decision block 180). If so, then the logic within the one or more modules 200/210 is reduced (action block 190), i.e., partially committed, and then evaluated to determine if the timing requirement is met when partially committed (decision block 160).

Figure 4:
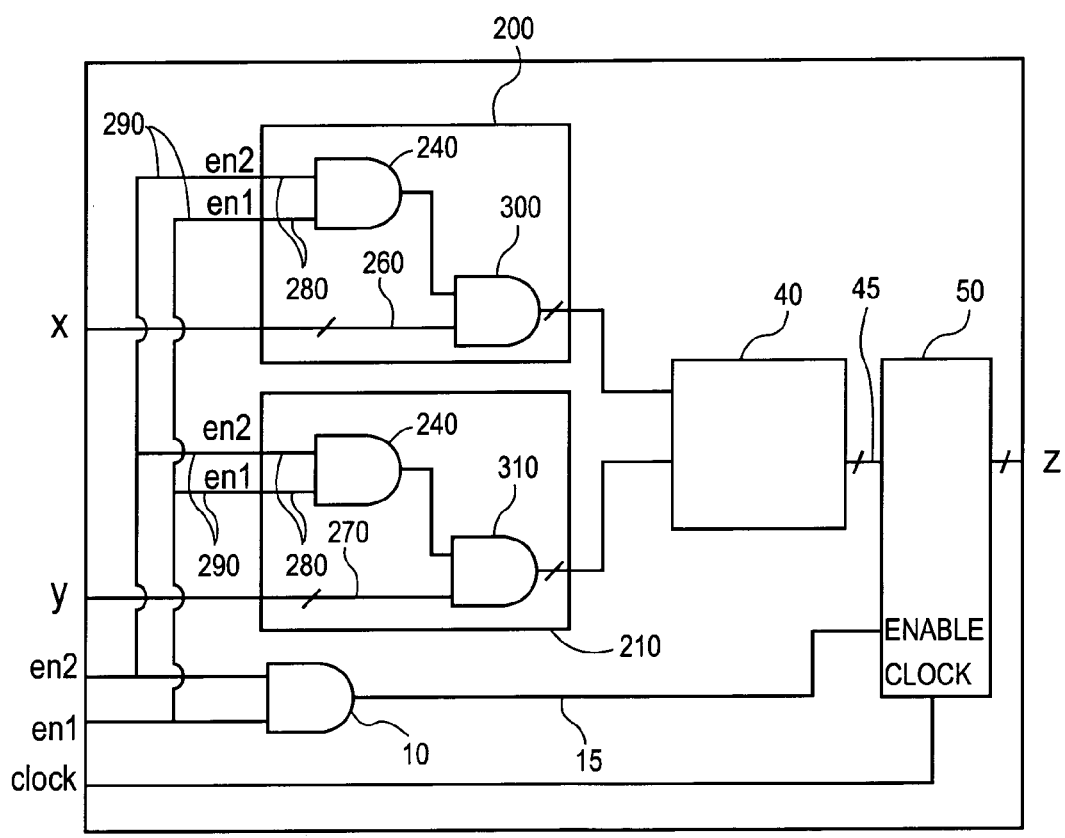
FIG. 4 is a circuit diagram with sleep-mode modules fully committed in accordance with an embodiment of the present invention.
Figure 5:
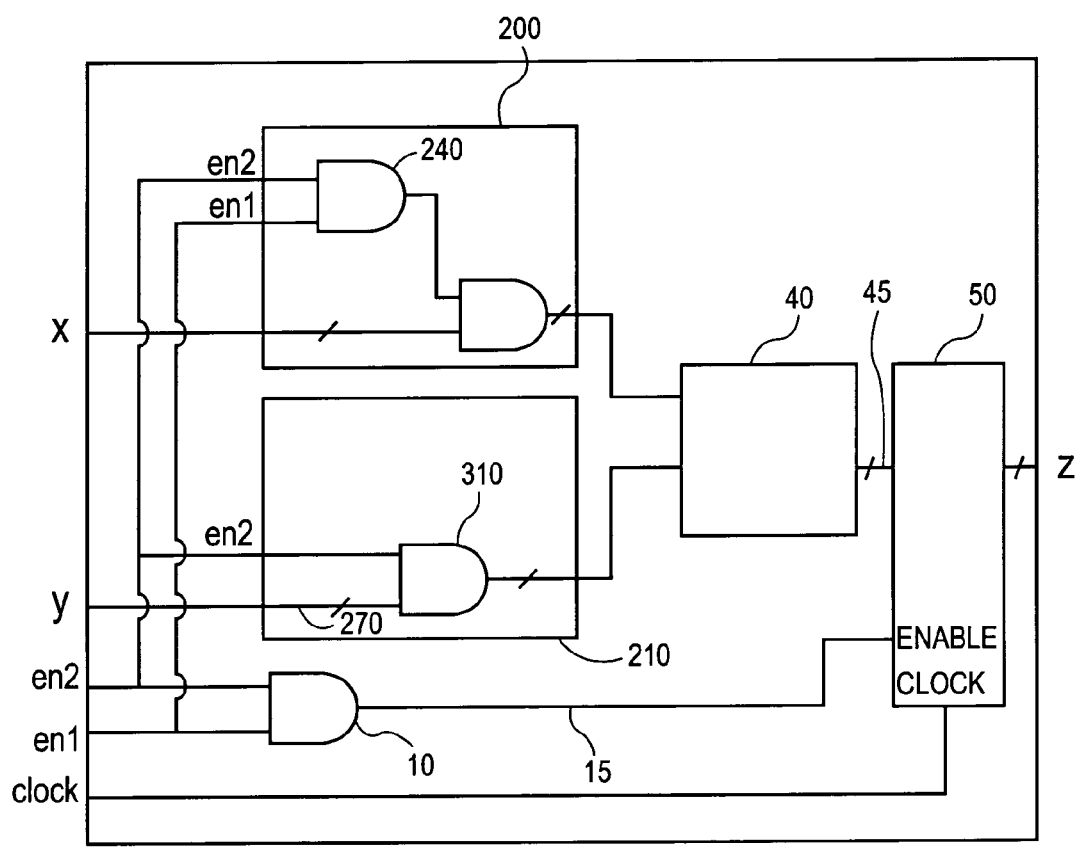
FIG. 5 is a circuit diagram with a sleep-mode module partially committed in accordance with an embodiment of the present invention.

For example, referring to FIG. 4, the sleep-mode logic in the sleep-mode module 210 for input y couples en1 and en2 together with an AND gate 240. It may be possible that only enable signal en1 causes the timing violation and that if input y were only coupled to enable signal en2 then the timing requirement would be satisfied. Turning to FIG. 5, the sleep-mode module 210 for input y is shown with a reduced logic. Only the enable signal en2 is coupled to input y. Partial commitment is possible because the enable logic, en1 and en2, and the inputs, x and y, were separately derived during synthesis and maintained after the optimization tools were applied. If the logic in the module 210 is not reducible (decision block 180), and the module 210 violates the timing requirement, then the logic is removed (action block 150). Partial commitment allows for a more flexible power saving approach.

Figure 6:
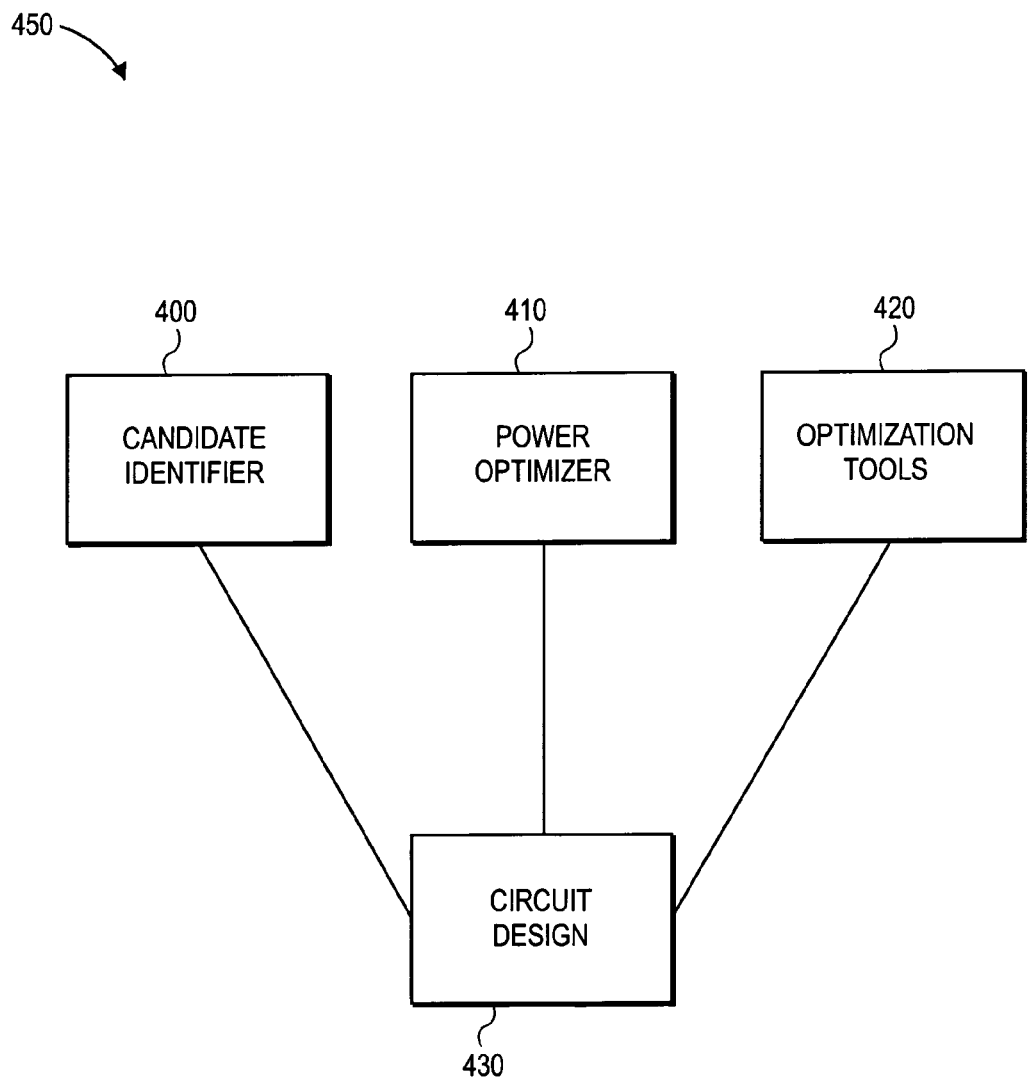
FIG. 6 is a diagram of a power optimization system in accordance within an embodiment of the present invention.

Turning to FIG. 6, a system 450 for optimizing the power consumption of a circuit design 430 constructed in accordance with an embodiment of the present invention is shown. The circuit design 430 is preferably synthesized at the RTL. The system 450 may reside on a computing device, such as a computer, which includes one or more processors and/or memory (not shown). The system includes a candidate identifier 400 to facilitate in identifying one or more candidates to apply one or more power saving techniques and/or modifications, such as the sleep-mode transformation. The candidate identifier may include a mechanism for creating CDFG's from the circuit design 430, as described above.

The system 450 may further include a power optimizing component (POC) 410, configured for optimizing the power consumption of the circuit design 430. The POC 410 may be configured to mark the one or more candidates within the circuit design 430, preferably on a gate level netlist. To mark and preserve the one or more candidates, the POC 410 may insert power saving techniques and/or modifications as markers, such as the sleep-mode modules described above, within the circuit design 430, without materially modifying the circuit's data or control paths, such as without connecting the logic—more specifically, the logic to achieve the power saving techniques and/or modifications—to the circuit 430. This may be desirable if timing and logic optimization were to be performed on the circuit design 430, so the techniques and/or modifications will not be included during the optimization process, as described above.

The POC 410 may further be configured to fully commit the logic of the one or more power saving techniques and/or modifications to the circuit design 430. Subsequently, the POC 410 may evaluate the techniques and/or modifications to determine whether any of the one or more power saving techniques and/or modifications indeed save power. If not, then the POC 410 may remove the one or more modifications and/or techniques from the circuit 430. If the one or more techniques and/or modifications save power, then the POC 410 may next determine whether the techniques and/or modifications violate the timing requirement of the circuit 430. If not, then the techniques and/or modifications may remain fully committed within the circuit 430 as part of the design.

If any of the techniques and/or modifications do violate the timing requirement, then the POC 410 may determine whether the violating techniques and/or modifications are reducible. The techniques and/or modifications that are not reducible may be removed from the circuit 430. The techniques and/or modifications that are reducible are then reduced or partially committed as described above. Then, the POC 410 may evaluate and determine whether the one or more techniques and/or modifications with the reduced logic violate the timing requirement of the circuit 430.

The system 450 may additionally include optimization tools 420, which optimize the timing and logic of the circuit design 430.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagram described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method of optimizing power consumption in a micro-electronic circuit, having at least one data path and at least one control path comprising the steps of:
   identifying one or more candidates for applying one or more power savings modifications;
   marking the one or more candidates within the micro-electronic circuit without materially modifying the at least one data path and the at least one control path;
   determining whether the one or more power saving modifications violate a design requirement of the circuit; and
   determining whether the one or more power saving modifications are reducible if the circuit design requirement has been violated with the one or more power saving modifications.

2. The method of claim 1, wherein the step of marking the one or more candidates uses the one or more power saving modifications as markers.

3. The method of claim 1, wherein the one or more modifications are one or more power saving modules having logic.

4. The method of claim 1, wherein the circuit design requirement is a timing requirement.

5. The method of claim 1, wherein the step of determining whether the one or more power saving modifications save power comprises a step of fully committing the one or more power saving modifications.

6. A method of optimizing power consumption in a micro-electronic circuit, having at least one data path and at least one control path, and a timing requirement, comprising the steps of:
   identifying one or more candidates for applying one or more power savings modules;
   marking the one or more candidates within the micro-electronic circuit with the one or more power saving modules without altering the at least one data path and at least one control path;
   fully committing the one or more power saving modules;
   determining whether the one or more power saving modules saves power;
   determining whether the timing requirement has been violated; and
   determining whether the one or more power saving modules is reducible if the timing requirement has been violated.

7. The method of claim 6, further comprising a step of reducing the one or more power saving modules if the one or more power saving modules are reducible.

8. The method of claim 6, further comprising a step of partially committing the one or more power saving modules if the one or more power saving modules are reducible.

9. The method of claim 6, wherein the circuit has a timing characteristic and the method further comprises a step of optimizing the timing characteristic.

10. The method of claim 9, wherein the step of marking the one or more candidates is executed before the step of optimizing the timing characteristic.

11. The method of claim 9, wherein the step of fully committing the one or more power saving modules is executed after the step of optimizing the timing characteristic.

12. The method of claim 9, further comprising a step of determining whether a reduced version of the one or more power saving modules improves the timing characteristic if the timing requirement is violated after the step of optimizing the timing characteristic is executed.

13. The method of claim 6, further comprising a step of removing the one or more power saving modules if the one or more modules do not save power.

14. The method of claim 6, wherein the one or more power saving modules comprise at least one sleep-mode transformation.

15. The method of claim 6, further comprising a step of removing the one or more power saving modules if the one or more modules violate the timing requirement and are not reducible.

16. The method of claim 6, wherein the step of identifying the one or more candidates for applying one or more power saving modules is achieved by using a control data flow graph.

17. The method of claim 6, wherein the micro-electronic circuit is synthesized at a register transfer level.

18. The method of claim 6, wherein the one or more candidates comprise at least one enable function and at least one functional block.

19. The method of claim 6, wherein the one or more candidates are marked with the one or more power saving modules on a gate level netlist.

20. A system for optimizing the power consumption of a micro-electronic circuit design having at least one data path and at least one control path and a timing requirement, comprising:
  a candidate identifier configured for identifying one or more candidates for applying one or more power saving modules within the micro-electronic circuit; and
  a power optimizer configured for marking the one or more candidates with the one or more power saving modules without altering the at least one data path or the at least one control path, for fully committing the one or more power saving modules, for determining whether the one or more power saving modules save power, for determining whether the one or more power saving modules violate the timing requirement, and for reducing the one or more power saving modules if the one or more power saving modules are reducible and violate the timing requirement.

21. The system in claim 20, further comprising at least one timing optimization tool.

22. The system in claim 20, wherein the candidate identifier comprises a mechanism for creating control data flow graphs for the circuit design.

23. The system in claim 20, wherein the micro-electronic circuit design is synthesized at a register transfer level.

24. A computer program product that includes a computer-usable medium having a sequence of instructions which, when executed by a processor, causes the processor to execute a process for optimizing the power consumption of a micro-electronic circuit having at least one data path and at least one control path, the process comprising the steps of:
  identifying one or more candidates for applying one or more power savings modifications;
  marking the one or more candidates within the micro-electronic circuit without materially modifying the at least one data path and the at least one control determining whether the one or more power saving modifications violate a design requirement of the circuit; and
  determining whether the one or more power saving modifications are reducible if the circuit design requirement has been violated with the one or more power saving modifications.

25. The computer program product of claim 24, wherein the step of marking the one or more candidates uses the one or more power saving modifications as markers.

26. The computer program product of claim 24, wherein the one or more modifications are one or more power saving modules having logic.

27. The computer program product of claim 24, wherein the circuit design requirement.

28. The computer program product of claim 24, wherein the step of determining whether the one or more power saving modifications save power comprises a step of fully committing the one or more power saving modifications.

29. A computer program product that includes a computer-usable medium having a sequence of instructions which, when executed by a processor, causes the processor to execute a process for optimizing the power consumption of a micro-electronic circuit having at least one data path and at least one control path, the process comprising the steps of:
  identifying one or more candidates for applying one or more power savings modules;
  marking the one or more candidates within the micro-electronic circuit with the one or more power saving modules without altering the at least one data path and at least one control path;
  fully committing the one or more power saving modules;
  determining whether the one or more power saving modules saves power;
  determining whether a timing requirement has been violated; and
  determining whether the one or more power saving modules is reducible if the timing requirement has been violated.

30. The computer product of claim 29, further comprising a step of reducing the one or more power saving modules if the one or more power saving modules is reducible.

31. The computer product of claim 29, further comprising a step of partially committing the one or more power saving modules if the one or more power saving modules is reducible.

32. The computer product of claim 29, wherein the circuit has a timing characteristic and the method further comprises a step of optimizing the timing characteristic.

33. The computer product of claim 32, wherein the step of marking the one or more candidates is executed before the step of optimizing the timing characteristic.

34. The computer product of claim 32, wherein the step of fully committing the one or more power saving modules is executed after the step of optimizing the timing characteristic.

35. The computer product of claim 32, further comprising a step of determining whether a reduced version of the one or more power saving modules improves the timing characteristic.

36. The computer product of claim 29, further comprising a step of removing the one or more power saving modules if the one or more modules do not save power.

37. The computer product of claim 29, wherein the one or more power saving modules comprise at least one sleep-mode transformation.

38. The computer product of claim 29, further comprising a step of removing the one or more power saving modules if the one or more modules violate the timing requirement and are not reducible.

39. The computer product of claim 29, wherein the step of identifying the one or more candidates for applying one or more power saving modules is achieved by using a control data flow graph.

40. The computer product of claim 29, wherein the micro-electronic circuit is synthesized at a register transfer level.

41. The computer product of claim 29, wherein the one or more candidates comprise at least one enable function and at least one functional block.

42. The computer product of claim 29, wherein the one or more candidates are marked with the one or more power saving modules on a gate level netlist.

* * * * *